United States Patent [19]

Lehureau et al.

[11] Patent Number: 5,801,794
[45] Date of Patent: Sep. 1, 1998

[54] COLOR DISPLAY DEVICE IN WHICH THE AREA OF A SPHERICAL LENS EQUALS THE AREA OF A SET OF RGB SUB-PIXELS

[75] Inventors: Jean-Claude Lehureau, Ste Genevieve Des Bois; Brigitte Loiseaux, Yvette; Cecile Joubert, Paris, all of France

[73] Assignee: Thomson-CSF, Paris, France

[21] Appl. No.: 605,069

[22] PCT Filed: Jun. 27, 1995

[86] PCT No.: PCT/FR95/00851

§ 371 Date: Mar. 8, 1996

§ 102(e) Date: Mar. 8, 1996

[87] PCT Pub. No.: WO96/02112

PCT Pub. Date: Jan. 25, 1996

[30] Foreign Application Priority Data

Jul. 8, 1994 [FR] France .................... 94 08476

[51] Int. Cl.⁶ .................... G02F 1/1335; G03B 21/00; G03B 21/26; G02B 27/10
[52] U.S. Cl. .................... 349/5; 349/8; 349/95; 353/31; 353/34; 359/619; 359/628
[58] Field of Search .................... 359/40, 41, 619, 359/628; 353/31, 34; 349/5, 7, 8, 95

[56] References Cited

U.S. PATENT DOCUMENTS

| | | |
|---|---|---|
| 4,319,322 | 3/1982 | Allain et al. .................... 364/200 |
| 4,451,412 | 5/1984 | Loiseaux et al. .................... 359/3 |
| 4,576,434 | 3/1986 | Huignard et al. .................... 359/7 |
| 4,847,521 | 7/1989 | Huignard et al. .................... 359/344 |
| 5,052,783 | 10/1991 | Hamada .................... 359/49 |
| 5,181,054 | 1/1993 | Nicolas et al. .................... 353/31 |
| 5,206,674 | 4/1993 | Puech et al. .................... 359/48 |
| 5,258,969 | 11/1993 | Refregier et al. .................... 369/100 |
| 5,272,496 | 12/1993 | Nicolas et al. .................... 353/34 |
| 5,323,372 | 6/1994 | Puech et al. .................... 369/100 |
| 5,355,187 | 10/1994 | Ogino et al. .................... 349/5 |
| 5,410,421 | 4/1995 | Huignard et al. .................... 359/49 |
| 5,416,617 | 5/1995 | Loiseaux et al. .................... 359/51 |
| 5,467,206 | 11/1995 | Loiseaux et al. .................... 359/40 |

FOREIGN PATENT DOCUMENTS

| | | |
|---|---|---|
| 0 465 171 | 1/1992 | European Pat. Off. . |
| 62-150317 | 7/1987 | Japan . |
| 63-118125 | 5/1988 | Japan . |
| 5-323307 | 12/1993 | Japan . |

Primary Examiner—William L. Sikes
Assistant Examiner—Walter Malinowski
Attorney, Agent, or Firm—Oblon, Spivak, McClelland, Maier & Neustadt, P.C.

[57] ABSTRACT

The invention relates to a color display device comprising a chromatic dispersive grating and an active matrix possibly of liquid crystal type. This device moreover comprises a matrix of spherical microlenses, the shape of the cross section of the microlenses being such that it makes it possible to compensate for the spreading of the R G B colored beams by virtue of the use of a dispersive grating, and hence to make best use of the circular aperture of projection objectives.

16 Claims, 4 Drawing Sheets

☐ image point

▽ image point

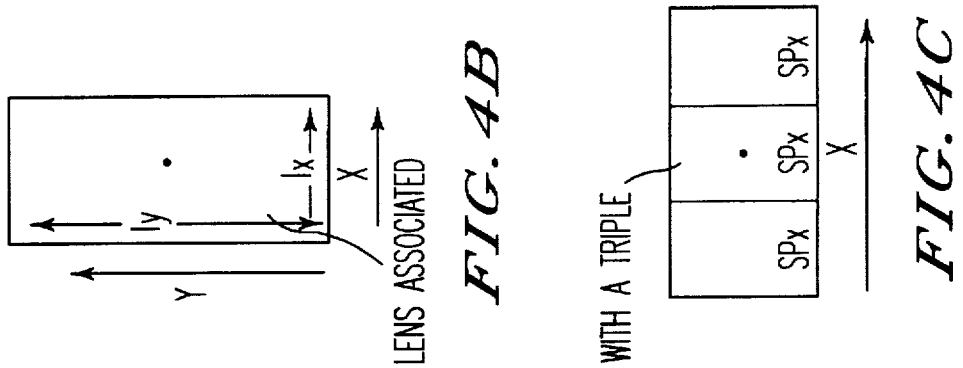
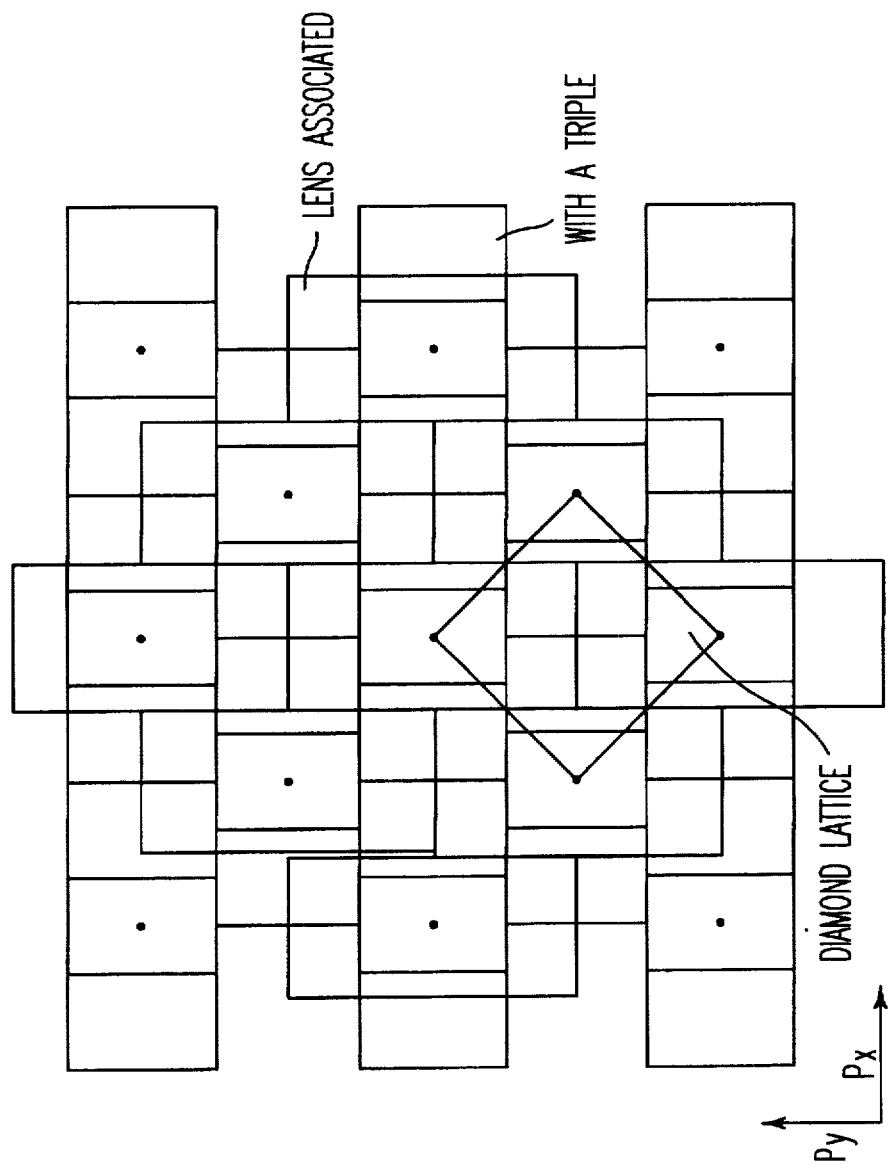

COLOR DISPLAY DEVICE IN WHICH THE AREA OF A SPHERICAL LENS EQUALS THE AREA OF A SET OF RGB SUB-PIXELS

BACKGROUND OF THE INVENTION

The invention relates to a color display device and more particularly to a liquid crystal color display device.

DISCUSSION OF BACKGROUND

In order to generate video images of large dimensions, there is currently a trend towards the use of active liquid crystal matrices (LCD) in projection devices.

The projection of color images can be carried out either on the basis of three active matrices, each illuminated by one of the primary components, red, green or blue (R, G, B) or on the basis of a single three-color active matrix, in this case equipped with colored filters.

The incorporation of R, G, B colored filters into the structure of the screen (LCD) makes it possible to produce color image projection devices of simple design: monovalve projector since they consist of a source and a single LCD screen.

However, the presence of these colored filters leads to a low luminous yield related to the absorption and spatial distribution of these colored filters which divides the effective transmission of the LCD screen by three.

The cost of such a screen also remains high since it is necessary to implement extra masking levels to obtain these colored filters and to seek to increase the density of the image elements (pixels) required in the case of a color screen (as compared with a monochrome screen) if it is wished to produce them with reasonable dimensions (diagonal less than 6 inches).

To obviate these drawbacks, display screens are envisaged in which the colored filters are replaced by a diffracting grating capable, on the basis of a single white source, of dispersing the red, green, blue (R, G, B) chromatic beams in three different directions. It thus becomes possible, with the aid of arrays of lenses enabling the light of each chromatic range to be focused substantially on a pixel of the screen, to produce a three-color screen without colored filters, compatible with monovalve projection. Each lens corresponds with a dot, representative of an (R, G, B) triple of sub-pixels. FIG. 1 illustrates a display device according to this prior art. A source (S) of a certain extent generates white light comprising the chromatic components (R, G, B). These components are together sent via a collimator to the dispersive grating (RC) which then generates differently directed beams (R, G, B). An array of lenses (MLC) enables these beams to be focused on pixels of the active matrix (LCD). The spots (SR, SG, SB) are representative of the red, green and blue images of the source (S) in the various pixels which thus enable all of the light flux issuing from the source (S) to be concentrated in the active matrix. At the exit of the matrix, a field lens (L) makes it possible to converge the set of colored beams in a projection optic (PO). However, the chromatic dispersion used in this type of device generates a horizontal spreading of the beams, which then requires an increased aperture of the projection optic horizontally whereas the vertical aperture of this optic is not utilized. FIG. 2 illustrates this dispersion. For a lens whose cross section has dimensions $h_L$ and $i_L$, if p represents the spacing separating two centers of sub-pixels, a horizontal spreading by p on each side of the image from the lens is obtained.

In order to make best use of the conventionally circular aperture of projection objectives, the invention proposes a display device which makes it possible to provide the best solution to this problem of the unsuitability of using a dispersive chromatic array coupled with a set of triples of sub-pixels with the geometry of the projection optics.

SUMMARY OF THE INVENTION

More precisely, the subject of the invention is a color display device comprising a light source (S) simultaneously emitting several ranges of chromatic components (R, G, B) and a spatial light modulator (LCD) comprising a set of triples of sub-pixels aligned along an axis x, each triple having a dimension $sp_x$ along this axis x, each sub-pixel corresponding to a chromatic component to be displayed, characterized in that it also includes between the light source (S) and the spatial light modulator (LCD);

at least one chromatic separator (RC) angularly separating along different directions the light of the various chromatic ranges (R, G, B);

an array of spherical lenses (MLC) enabling the light of each chromatic range to be focused substantially on a sub-pixel, the said array of lenses having dimensions substantially equal to those of the spatial light modulator and each lens having a cross section defined by the dimensions Px and Py if ly is the dimension along an axis y perpendicular to the axis x, the axes x and y corresponding to the axes of the plane (Px, Py) defined by the spatial light modulator, the said cross section having the same area as that of a triple but the dimension lx of which along the axis x is smaller than the dimension 3 $sp_x$.

In the device according to the invention, the light modulator can advantageously be a liquid crystal screen. The array of spherical lenses (MLC) can be affixed to the spatial light modulator (LCD).

BRIEF DESCRIPTION OF THE DRAWINGS

The invention will be better understood and other advantages will emerge from reading the description which follows given by way of non-limiting example, and the appended figures in which:

FIG. 4 shows diagrammatically the superposition of a lens array on a "DELTA" structure in an exemplary display device according to the invention;

FIGS. 3a and 3b thus give exemplary distributions of colors within a dot. FIG. 3a represents an arrangement in which the pixels of one and the same color are aligned along a vertical direction ("stripe" configuration). FIG. 3b represents an arrangement in which the pixels of one and the same color are aligned along an inclined direction but do not touch one another. In this configuration, also called a "DELTA" structure, the elementary triples are laid out in quincunx fashion and two rows are used to define a series of white points, unlike the configuration described in FIG. 3a in which one row corresponds to a series of white points.

Figures 3A, 3B:
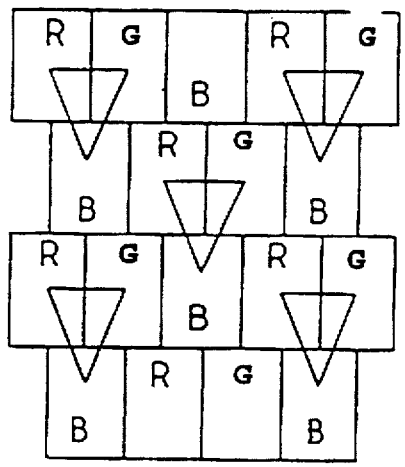
FIGS. 3a and 3b illustrate exemplary arrangements of the image elements of a liquid crystal screen.

This "DELTA" configuration is particularly beneficial insofar as, for one and the same area of active matrix, it makes it possible to use N/2 white points, if N is the number of white points used in a "stripe" type configuration, to obtain the same image resolution as illustrated by comparing FIGS. 3a and 3b. Moreover, the so-called "DELTA" structure leads to elementary sub-pixels whose geometry is better adapted to that of the circular image of the source. Indeed, to obtain the same row-wise and column-wise spatial resolution, a "stripe" pixel should be square, of side ps. This implies elementary pixel dimensions ps and ps/3.

In the "DELTA" structure such as represented in FIG. 3b, the column-wise spatial frequency identical to that corresponding to a "stripe" structure, corresponds to an elementary sub-pixel dimension h whereas the row-wise spatial frequency corresponds to 3/2 l (l the other dimension of the sub-pixel). It is then apparent that the elementary area of a "stripe" sub-pixel is equal to ps×ps/3, whereas in the "DELTA" structure this elementary area h×l=ps×3/2 ps. In this latter structure, elementary sub-pixels are employed which are of larger area and above all are better adapted to the circular geometry of the image of the source which it is sought to focus in each elementary sub-pixel.

Figure 1:
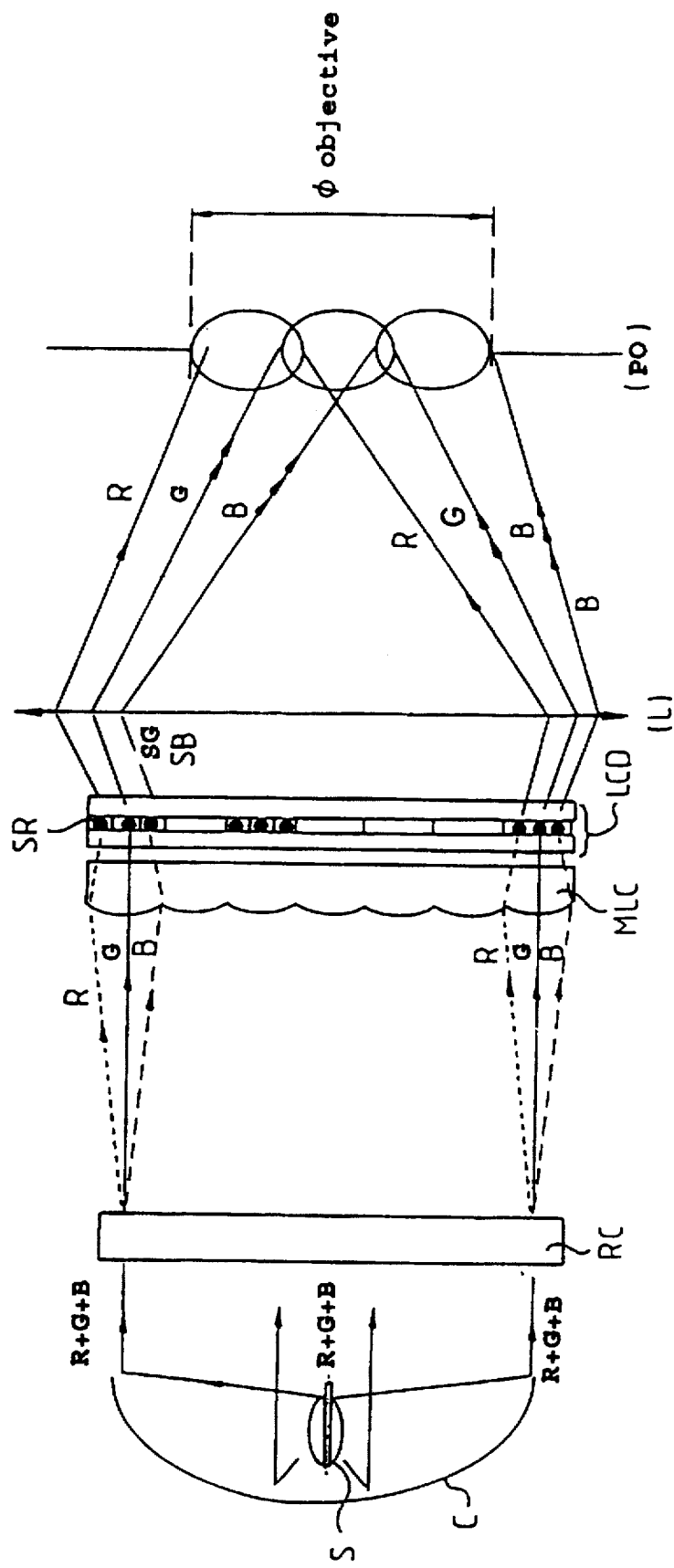
FIG. 1 illustrates an exemplary display device according to the prior art, using a diffracting grating.
Figure 2:
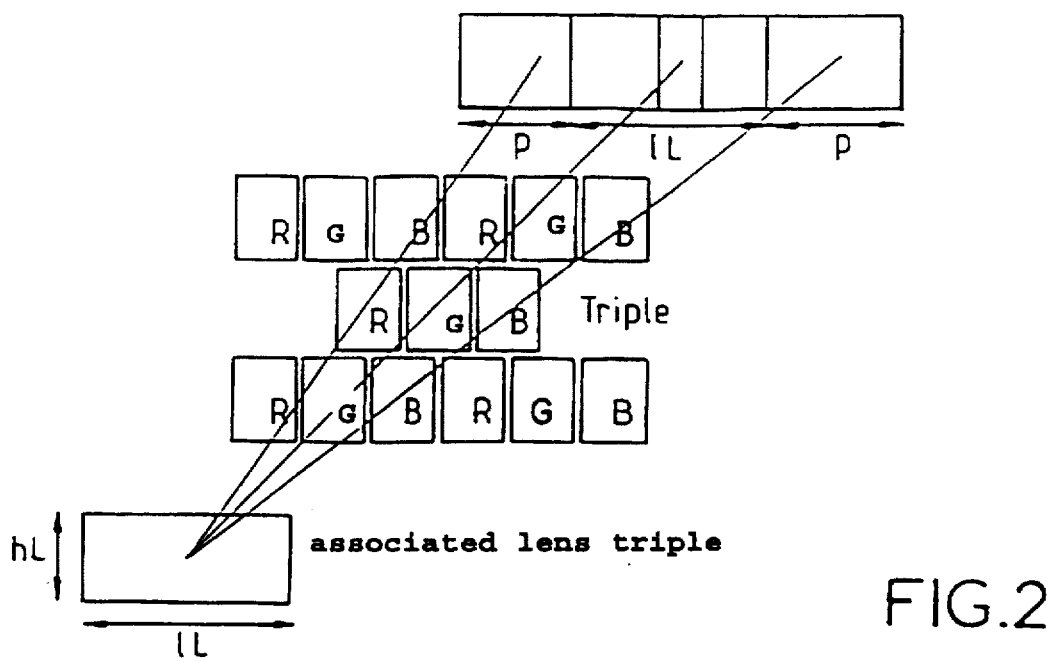
FIG. 2 shows diagrammatically the spreading of the light beams, in the vicinity of a projection optic in a display device such as that illustrated in FIG. 1.

The general principle of operation of the device according to the invention can be described accurately on the basis of FIG. 1.

The function of the separator (RC) is to angularly separate the three spectral components of the collimated light source (S). The three spectral bands are next focused along three axes in the focal plane of each lens. In the example shown diagrammatically in FIG. 1, the green-colored beam (G) is normal to the focal plane of the lenses (MLC) and the red (R) and blue (B) beams are symmetrical with respect to this normal and make an angle of incidence θi. Consequently, by adapting on the one hand the angle of incidence θi of each spectral component on the spherical lenses and on the other hand the focal length f of these lenses it is possible simultaneously to achieve:

the successive focusing of each color in the plane of the active matrix (LCD) and centered on each row of sub-pixels addressed by the same color. The characteristics (θi, f) of the device depend on the size of the active matrix (LCD), on the number of pixels and on the distribution of the sub-pixels within a dot;

a gain in the transmission factor of the matrix (LCD); when the focused colored band to a dimension smaller than that of the elementary sub-pixel. The value of this gain depends on the following parameters, the aperture of the spherical lens, the geometrical extent of the light source ($E_s$) the size of the matrix (LCD) characterized by its diagonal (D).

The separation (RC) function can advantageously be provided by a diffractive grating whose spacing is perpendicular to the direction of alignment of the sub-pixels R, G, B.

Herein is proposed an exemplary embodiment of the device adapted to a size of LCD screen possessing R, G, B sub-pixels distributed as trios.

The characteristics of the LCD screen are as follows:

a 16/9 format, a 4-inch diagonal, an image defined by 480 lines and 640 columns, for an 80×60 mm² cell and $$125 \times \frac{250}{3} \ \mu m^2$$

elementary sub-pixels if the dimensions of three R, G, B sub-pixels are $$125 \times \frac{125}{3} \ \mu m^2.$$

According to the conventional LCD technologies, the line width required for the addressing of the pixels is around 15 μm (a line which masks part of the transparent pixel);

the microlens array can be made directly on one of the backing plates of the LCD screen and be such as that represented in FIG. 4.

By using a light source S of geometrical extent $E_S=80$ mm²-sr, we shall compare the performances obtained in terms of the light flux capable of passing through a given projection optic.

In fact, the limit value of the geometrical extent $E_S(max)$ of the source depends on the size of the LCD screen. It may be expressed as follows as a function of the various parameters of the device $$E_s(max) = 400 \ D^2 \times \phi_f^2 / f^2$$

where D is the diagonal of the screen expressed in inches f the focal length of the lenses $\phi_f$ the useful width of the pixel (pixel minus the line width)

By considering the image of the source in the focal plane of the lens to be of dimension equal to the useful width of a sub-pixel and hence that $E_S=E_S(max)$, it is possible to determine f and hence the extension t within the glass t=f.n, this extension t corresponding to the distance between the matrix of lenses and the liquid crystal cell.

It is thus possible by calculating the focal length f, to determine the aperture of the projection optic N required to collect all the R, G, B sub-pixel images defined by the array of lenses, taking into account the spreading of the said images.

Figure 5:
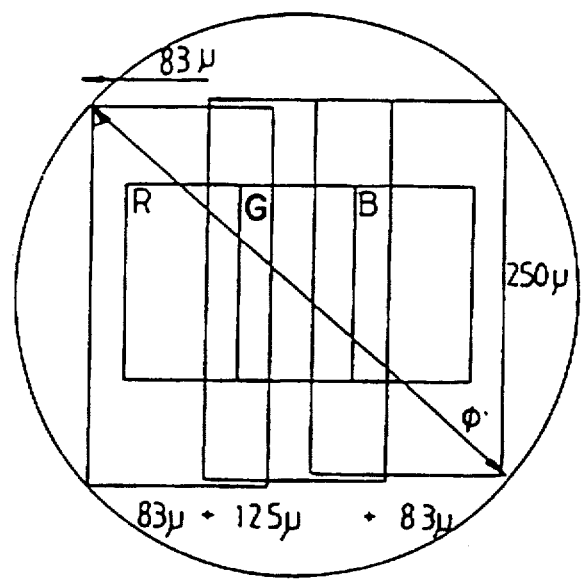
FIG. 5 illustrates the superposition of the images from a lens which are made by the illumination of the three beams, red, green, blue in an exemplary device according to the invention, It is recalled that in display devices which use an active matrix (LCD), a set of three sub-pixels (R, G, B) makes it possible to define a white pixel (D), and this set is generally called a dot.

Indeed, it is possible to calculate the aperture N of the objective required to collect the three light fluxes R G B. Since N=$t_{objective}/\phi$ objective with t the extension of the objective of projective and $\phi$ objective the diameter illustrated in FIG. 1. Also, by homothety N=t/$\phi$ with $\phi$ representing the magnitude of the spreading of the three illuminations R, G, B (illustrated in FIG. 5). This diameter $\phi$ corresponds to the diagonal of the rectangle defined by the dimensions 250 μm×(80+125+83) μm. Or again 385 μm.

These calculations were carried out in three illustrative cases so as to compare the device according to the invention with other types of devices according to the prior art. The results are gathered together in the Table (I) below.

| | 1st case prior art | 2nd case prior art | 3rd case invention |
|---|---|---|---|
| configuration | stripe | delta | delta |
| mask | 15 μm | 15 μm | 15 μm |
| diagonal | 4 inches | 4 inches | 4 inches |
| number of points | 480 × 640 | 480 × 320 | 480 × 320 |
| dimensions of the white pixel | 125 × 125 | 125 × 250 | 125 × 250 |
| dimensions of a sub-pixel | 125 × 125/3 | 125 × 250/3 | 125 × 250/3 |

|  | 1st case prior art | 2nd case prior art | 3rd case invention |
|---|---|---|---|
| dimensions of a lens | 125 × 125 | 125 × 250 | 125 × 250 |
| dimensions of a lens | 125 × 125 | 125 × 250 | 125 × 250 |
| orientation of the lenses/pixels | homothetic | homothetic | oriented at 90° |
| extension t | 3.60 μm | 900 μm | 900 μm |
| aperture N | 0.8 | 1.2 | 1.5 |

Illustrative case No. 1 results in an unrealistic type of lens and unrealistic type of objective (lenses on a 300 μm backing plate, difficult to produce). The flux of this type of projector is then constrained to be appreciably restricted.

Illustrative case No. 2 certainly leads to a realistic type of lens (900 μm backing plate) but a highly apertured objective which is difficult to envisage. In this case it is necessary to choose lenses with a larger extension so as to increase the aperture N. The projected flux is then reduced.

In the illustrative case of the invention, altogether realistic values of extension and aperture are determined allowing a large luminous flux to pass.

Indeed, it is possible to pass the flux from a 150 W lamp, of extent $E_S=80$ mm$^2$sr, efficiently into a 4" cell, using microlenses on a 900 μm backing plate. An exit flux of the order of 300 to 400 lumens is then obtained from an initial flux of 12000 lumens, taking into account the conventional efficiency of an active liquid crystal matrix (5%) and of the area ratio of the cell to a circumscribed circle (60%).

Table (II) herein gives the performances obtained in cases 1, 2 and 3 with the same realistic projection aperture (N=1.5), and allows comparison with an active matrix using colored filters.

| Configuration | Colored Filters no lens | Stripe + homothetic lenses | delta + homothetic lenses | delta + optimized lenses |
|---|---|---|---|---|
| extension (μm) | none | 900 | 1150 | 900 |
| flux (lumens) | 50 | 55 | 220 | 350 |

We claim:

1. Color display device comprising a light source simultaneously emitting several ranges of chromatic components and a spatial light modulator comprising a set of triples of sub-pixels aligned along an axis x, each sub-pixel having a dimension sp$_x$ along this axis x, and each sub-pixel corresponding to a chromatic component to be displayed, said device further including between the light source and the spatial light modulator;

at least one chromatic separator angularly separating along different directions the light of the various chromatic ranges;

an array of spherical lenses enabling the light of each chromatic range to be focused substantially on a sub-pixel, the said array of lenses having dimensions substantially equal to those of the spatial light modulator and each lens having a cross section defined by the dimensions lx and ly with ly being a dimension along an axis y perpendicular to the axis x, the axes x and y corresponding to the axes of a plane (Px, Py) defined by the spatial light modulator, said cross section having the same area as that of said set of triples and wherein said dimension lx along the axis x is smaller than 3 sp$_x$.

2. Color display device according to claim 1, characterized in that the sub-pixels of one and the same color are aligned along a direction inclined with respect to the axis x, and are not adjacent and that the center of each lens corresponds substantially to the center of a sub-pixel of one and the same color.

3. Color display device according to claim 2, characterized in that the cross section of the lenses is a rectangle identical to that defined by each set of triples, but oriented perpendicularly to the said set of triples in the plane.

4. Color display device according to claim 2, characterized in that the chromatic separator includes a phase microstructure component obtained by optical recording in a photosensitive material.

5. Color display device according to claim 2, characterized in that the spatial light modulator is a liquid crystal screen.

6. Color display device according to claim 2, characterized in that the lens array is affixed to the spatial light modulator.

7. Color display device according to claim 1, characterized in that the cross section of the lenses is a rectangle identical to that defined by each set of triples, but oriented perpendicularly to the said set of triples in the plane.

8. Color display device according to claim 7, characterized in that the chromatic separator includes a phase microstructure component obtained by optical recording in a photosensitive material.

9. Color display device according to claim 7, characterized in that the spatial light modulator is a liquid crystal screen.

10. Color display device according to claim 7, characterized in that the lens array is affixed to the spatial light modulator.

11. Color display device according to claim 1, characterized in that the chromatic separator includes a phase microstructure component a obtained by optical recording in photosensitive material.

12. Color display device according to claim 11, characterized in that the spatial light modulator is a liquid crystal screen.

13. Color display device according to claim 11, characterized in that the lens array is affixed to the spatial light modulator.

14. Color display device according to claim 1, characterized in that the spatial light modulator is a liquid crystal screen.

15. Color display device according to claim 14, characterized in that the lens array is affixed to the spatial light modulator.

16. Color display device according to claim 1, characterized in that the lens array is affixed to the spatial light modulator.

* * * * *